INVENTOR.
Silas V. Beasley
BY
Attorney

3,317,709
ELECTRIC GRIDDLE
Silas V. Beasley, Algonquin, Ill., assignor to McGraw-Edison Company, Milwaukee, Wis., a corporation of Delaware
Filed May 11, 1964, Ser. No. 366,386
6 Claims. (Cl. 219—449)

This invention relates to griddles and more particularly to electrically heated griddles.

Heretofore electrically heated griddles have been made using a heavy grid plate with the application of electrical heating elements to the bottom thereof usually by securing the elements in direct contact with the bottom surface of the grid plate to secure a maximum heat transfer. The elements are formed in various configurations by different manufacturers with the common objective of providing a uniform heat delivery over the surface of the griddle.

It has been found that in certain applications a uniform temperature of the griddle surface is necessary for the unit to give an acceptably prepared product and on grid plates as heretofore known the heat drain from the edge of the griddle to the supporting structure caused a marked temperature reduction with the result that several inches of the edge portions of the griddle were useless resulting in the owner possessing in effect a much smaller unit than appeared since only the central portion was useable.

It would appear that this problem could be overcome by higher heat concentration about the perimeter by simply increasing the heating element density of these areas. Such a solution does not yield a satisfactory result because of the differing character of the heat dissipation in these areas.

The applicant has provided a griddle heating and temperature control device that maintains the grid plate upper surface at a selected temperature over the entire surface and over the entire range of temperature control.

It is an object of this invention to provide an improved electric griddle that affords a uniform temperature over the entire grid surface.

It is also an object of this invention to provide an improved heating element arrangement for an electric griddle.

It is a further object of this invention to provide a temperature control system for an electric griddle to attain a control surface temperature over the entire griddle cooking surface.

These and other objects and advantages of this invention will become apparent from the following description when taken in connection with the accompanying drawings wherein:

FIGURE 3 is a section view taken along line 3—3 of FIGURE 2 and including the grid plate; and FIGURE 4 is a wiring diagram of the griddle of FIGURE 1.

Figure 1:
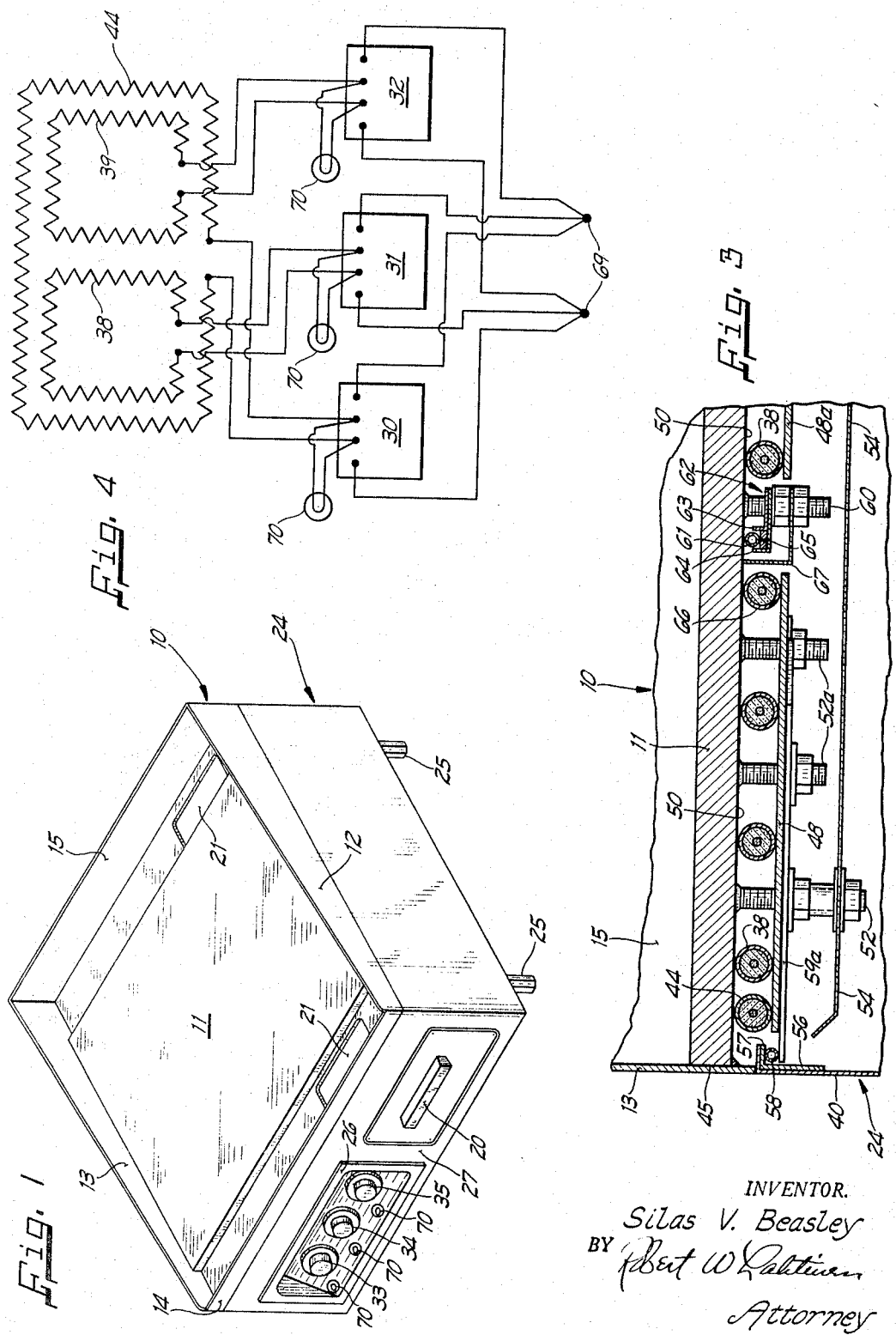
FIGURE 1 is an isometric view of a griddle incorporating a preferred form of this invention.

Referring to the drawings FIGURE 1 shows a griddle which incorporates the invention having a grid plate assembly 10 including a heated grid plate 11, sidewall portions 12, 13 welded to the grid plate and front and rear wall members 14, 15 which have inwardly turned horizontally extending portions that are welded to the grid plate 11 and sidewall portions 12 and 13 to form grease troughs at both the front and rear of the grid plate. The grease troughs communicate with a grease drawer 20 through the apertures 21. The grid assembly 10 is supported on a case and frame assembly 24 which carries a series of supporting legs 25. A control panel 26 is mounted through the front case wall 27 carrying a series of three thermostats 30, 31 and 32 (shown schematically in the wiring diagram of FIGURE 4) which are respectively regulated by the calibrated knobs 33, 34 and 35 to control the supply of electrical current to the grid plate heating elements as described hereafter.

Figure 2:
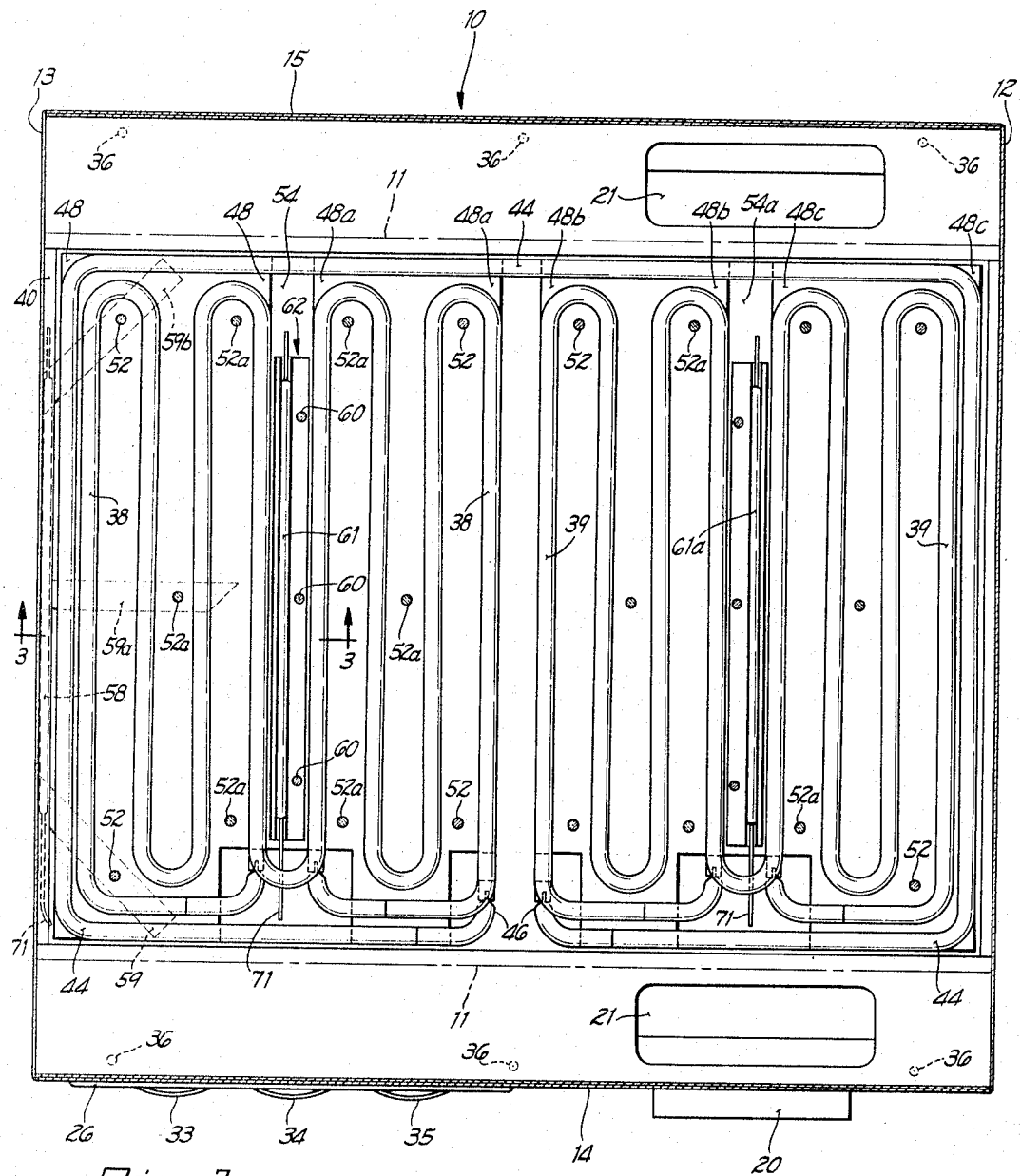
FIGURE 2 is a plan view of the griddle of FIGURE 1 with the grid plate removed.

The case of stainless steel sheet material shrouds a supporting frame structure to which the grid assembly is supportingly connected by a series of six depending bolts 36 (FIGURE 2). The corresponding front side and rear walls of the case and frame assembly 24 and the griddle assembly 10 have vertically aligned exterior surfaces to provide continuous front, side and rear wall surfaces as shown in FIGURE 3 at the juncture of the grid assembly side wall 13 and the case and frame assembly sidewall 40. Referring to FIGURES 2 and 3 a pair of principal heating elements 38, 39 each having a generally serpentine configuration are formed to deliver heat in a substantially uniform manner over the surface of the grid. A single pass perimeter heating element 44 margins the edge surface 45 of the grid plate 11 and completely surrounds the principal elements 38, 39 except for the short space at the front between the terminal end portions 46. A series of four clamp plates 48, 48a, 48b and 48c secure the heating elements 38, 39 and 44 against the lower surface 50 of the grid plate 11 by a series of five bolts 52 and 52a which extend downwardly from the grid plate lower surface. Underlying the elements are a pair of baffles or radiation shields 54, 54a each of which is substantially co-extensive with a vertical projection of an adjoining pair of clamp plates 48, 48a and 48b, 48c.

Within the case is an angle member 56 which forms a portion of the supporting frame of the case frame assembly 24. Beneath the lower surface of the horizontal flange 57 of the angle member 56 a heat sensing element 58 in the form of an elongated liquid containing bulb member is retained by three straps 59, 59a and 59b. As seen in FIGURE 3 the bolts 52 have a greater downward projection than the bolts 52a and extend through a spacing sleeve and the underlying baffle 54 to support the baffle in a predetermined spaced underlying relation with respect to the pair of clamping plates 48, 48a. In like manner the baffle 54a is secured below clamp plates 48b, 48c.

Between clamp plates 48 and 48a three depending bolts 60 secure an elongated thermostat sensing element 61 against the lower surface 50 of the grid plate 11. The thermostat sensing element 61 is retained against the lower surface 50 between the clamp plates 48, 48a at the approximate center of the grid plate area supplied by the heating element 38. The sensing element 61 is secured in position by a clamping assembly 62 including a pair of angles 63, 64 which are welded together to form an element retaining channel portion with a layer of resilient material 65 disposed in the channel and interposed between the web of the channel and the heat sensing element 61. The bolts 60 securing the clamping assembly also retain an angle member 67 that serves as a radiation shield to isolate the sensing element 61 from the nearest pass 66 of the heating element 38. A similar structure maintains the heating element 61a in contact with the grid plate lower surface 50 between the clamp plates 48b, and 48c.

In FIGURE 4 the wiring diagram shows the heating elements 44, 38 and 39 controlled respectively by the thermostats 30, 31 and 32 each of which thermostats is connected to the line connections 69 and includes a pilot light 70 to indicate when the associated thermostat is functioning to supply current to the heating element which it controls. The thermostats shown are of conventional design using a heat sensing element connected thereto by a capillary tube 71 with temperature regulation effected by rotating a calibrated dial. In the griddle shown the flow of current to the perimeter heating element 44 is regulated by thermostat 30 which is adjustable by rotation of the calibrated knob 33. The heat sensing element 58 of the thermostat 30 is connected thereto by a capillary tube 71. Similarly the heat sensing elements 61, 61a are respectively connected to thermostats 31, 32 which are respectively adjustable by calibrated knobs 34, 35 and regulate current flow of the principal heating elements 38, 39.

In operating the griddle it has been found that heretofore used constructions wherein heat is supplied evenly to the grid surface results in a marginal portion of usually three to four inches about the periphery of the cooking surface which has a reduced temperature resulting in that portion of the cooking surface being not normally useable. When a relatively uniform surface temperature is required the user of the unit finds that the unit does not have the cooking surface that it appears to possess. This has resulted in the user for such purposes as the preparation of hamburgers using the central portion where the desired temperature is maintained for cooking meat and using the marginal cooking surface for warming buns since such area is not otherwise useable. In some forms of service as the preparation of pancakes the inability to maintain the desired temperature causes the marginal cooking surface to be unuseable.

The character of the heat loss of the central cooking surface and that of the marginal portion thereof is different and the heating requirements do not have a proportional relation. Accordingly increased heat delivery at the periphery by increasing the density of heating elements adjoining the edge of the grid plate does not give uniform temperature across the entire cooking surface of the grid plate. In one method the supplementary perimeter heating element 44 may be controlled by placing an infinite switch in series with the element to regulate the supply of supplementary heat to offset the heat sink effect of the grid plate edges. In the embodiment illustrated and described the supplementary or perimeter element is positively controlled and a selected cooking surface temperature is maintained by a thermostatic control that effectively senses the ambient conditions that influence the cooking surface temperature adjoining the edge of the grid.

In the griddle of this invention the grid plate receives a substantially uniform delivery of heat from the principal elements 38, 39 which serve separate defined areas to enhance the flexibility of the unit. The perimeter heating element is independently controllable by a separate thermostat that would normally be set at the same setting as the principal elements to maintain the same temperature across the entire cooking surface. By independently controlling the perimeter unit the problem created by the different character of the perimeter heat loss is overcome.

Another problem is the location of the heat sensing element with respect to the perimeter heating element and the marginal cooking surface of the grid plate. Although the heat sensing element 58 could be retained directly against the lower surface of the grid plate as are the sensing elements 61, 61a associated with the principal heating elements 38, 39 in practice the perimeter element is positioned so close to the grid plate edge that proper shielding of the heat sensing element from the heating element is precluded. It has been found that by sensing at a location slightly removed from the griddle edge in conductive heat receiving relation with the grid plate marginal edge and partially shielded from the adjoining heating element a closer more accurate control can be maintained. Such a position achieves a balance between directly sensing the grid surface temperature and receiving direct radiant heat from the controlled heating element for heat anticipation to control the grid surface temperature within a smaller range than is the normal experience with griddles. Accordingly in the embodiment shown the perimeter thermostatic heat sensing element contacts the metal frame member angle 56 which is in conductive heat communication through the stainless steel case wall 40 and stainless steel grid assembly side 13 with the grid plate edge surface 45. The angle member also acts as a partial shield with respect to heat radiated from the element.

Although but one embodiment has been shown and described it will be apparent to those skilled in the art that various changes and modifications can be made therein without departing from the spirit of the invention or the scope of the appended claims.

What is claimed is:

1. A griddle comprising a horizontal grid plate having upper and lower surfaces; first heating means comprising a plurality of sheathed electrical resistance heating elements clamped to the lower surface of said grid plate and operable to deliver heat substantially uniformly over the surface of said grid plate; second heating means comprising a pair of sheathed heating elements clamped to the lower surface of said grid plate intermediate said first heating elements and the marginal edge of said lower surface and co-operating to substantially completely surround said first heating means; first control means comprising a series of thermostats equal in number to said plurality of first heating means with the respective sensing portions thereof clamped to said grid plate lower surface to respectively regulate the supply of electrical current to said first heating means elements and a second control means comprising a pair of thermostats having elongated sensing elements, said sensing elements underlying said grid plate and respectively underlying said pair of second heating means sheathed heating elements in vertically spaced relation.

2. A griddle comprising a substantially rectangular horizontal grid plate having upper and lower surfaces and a pair of parallel vertical side surfaces; a side wall assembly abutting one of said side surfaces; a first sheathed electrical heating element secured to the lower surface of said grid plate and formed in a pattern to deliver heat substantially uniformly to the upper surface of the overlying grid; a first thermostatic control means including a first heat sensing element to regulate the flow of electric current to said first heating element, said first heat sensing element being positioned below said grid and generally centrally positioned with respect to said first heating element; a second sheathed electrical heating element secured in contact with the lower surface of said grid and formed as a single continuous pass margining the edge of said grid and substantially completely surrounding said first element; a second thermostatic control means independent of said first control means and including a second heat sensing element disposed in contacting conductive heat receiving relation to said side wall assembly in underlying spaced relation to said grid and laterally outward of said second heating element.

3. A griddle comprising a grid plate having upper and lower surfaces; first electrical heating means secured to said lower surface of said grid in heat delivering relation to said upper surface of said grid plate, the heat release portion of said first electrical heating means being disposed substantially uniformly with respect to said grid lower surface; support means connected to said grid plate along the marginal edge portions thereof and supporting said grid plate in a horizontal position; second electrical heating means secured to said lower surface of said grid plate in substantially completely surrounding relation to said first electrical heating means, said second electrical heating means being disposed intermediate said first electrical heating means and said support means; and first and second control means for respectively regulating the supply of electricity to said first and second electrical heating means.

4. The griddle of claim 3 wherein said first and second electrical heating means comprise metal sheathed electrical resistance heaters clamped against said lower grid surface.

5. The griddle of claim 3 wherein said support means comprises side wall and grease trough portions which cooperate to continuously engage and support said grid plate along the marginal edge portion thereof.

6. The griddle of claim 5 wherein said second control means includes a thermal sensing element mounted in spaced relation to said second electrical heating means and said grid plate with a direct conductive heat transfer path provided between the marginal edge portion of said grid plate and said thermal sensing element by said side wall.

References Cited by the Examiner

UNITED STATES PATENTS

| | | | |
|---|---|---|---|
| 2,362,757 | 11/1944 | Lang | 99—425 |
| 2,419,083 | 4/1947 | Myers | 219—449 |
| 2,617,005 | 11/1952 | Jorgensen | 219—466 |
| 3,004,130 | 10/1961 | Miller | 219—510 |
| 3,130,664 | 4/1964 | Jarmuth et al. | 219—466 |
| 3,166,006 | 1/1965 | Lennox | 219—443 |

RICHARD M. WOOD, *Primary Examiner.*

L. H. BENDER, *Assistant Examiner.*